United States Patent [19]
Koyama et al.

[11] Patent Number: 5,403,795
[45] Date of Patent: Apr. 4, 1995

[54] PLATELET α-$Al_2O_3$ BASED CERAMIC COMPOSITE

[75] Inventors: Takashi Koyama, Omiya; Koichi Niihara, Hirakata, both of Japan

[73] Assignee: Mitsubishi Materials Corporation, Tokyo, Japan

[21] Appl. No.: 49,204

[22] Filed: Apr. 19, 1993

[30] Foreign Application Priority Data

| Apr. 23, 1992 | [JP] | Japan | 4-129973 |
| Apr. 27, 1992 | [JP] | Japan | 4-134273 |
| Apr. 27, 1992 | [JP] | Japan | 4-134274 |
| Apr. 27, 1992 | [JP] | Japan | 4-134276 |
| Apr. 29, 1992 | [JP] | Japan | 4-134275 |

[51] Int. Cl.$^6$ .............................................. C04B 35/10
[52] U.S. Cl. ...................................... 501/127; 501/89; 501/105; 51/309
[58] Field of Search ................. 501/89, 105, 127, 153; 51/309

[56] References Cited

U.S. PATENT DOCUMENTS

| 4,331,048 | 5/1982 | Dworak et al. | 501/105 X |
| 4,829,028 | 5/1989 | Seki et al. | 501/105 |
| 5,277,702 | 1/1994 | Thibault et al. | 501/153 X |

*Primary Examiner*—Karl Group
*Attorney, Agent, or Firm*—Vineet Kohli; Thomas R. Morrison

[57] ABSTRACT

A platelet α-$Al_2O_3$ based ceramic composite consists of $Al_2O_3$ powder, promoters and controllers. The composite is prepared by mixing aluminum oxide powder with promoters and controllers. The mixture is shaped and sintered to form an object. In one embodiment of the invention, the promoters are either salts or oxides of alkaline metals and alkaline earth metals. The salts are oxidized during sintering.

4 Claims, 1 Drawing Sheet

PLATELET α-AL₂O₃ BASED CERAMIC COMPOSITE

BACKGROUND OF THE INVENTION

1. Field of the Invention

The present invention relates to an α-aluminium oxide (hereinafter referred to as "α-Al$_2$O$_3$") based ceramic composite which exhibits superior wear-resistance and improved toughness and; almost free from breakage or chipping of a cutting edge not only when continuously cutting steel or cast iron, but also when discontinuously cutting steel or cast iron, which requires a high toughness, together with excellent cutting performance.

2. Description of the Related Art

The conventionally known ceramic materials for this purpose include Al$_2$O$_3$-ZrO$_2$ ceramics and Al$_2$O$_3$-ZrO$_2$-MgO, Y$_2$O$_3$ and CeO$_2$ ceramics disclosed in Japanese Patent Publication No. 59-6,274, which have microstructures an example of which is shown in the structural photograph based on a scanning-type electron microscope given in FIG. 1. These ceramics are used for cutting tools mainly for continuous cutting of steel.

Conventional Al$_2$O$_3$-ZrO$_2$ ceramics cannot fully satisfy these requirements because of the easy occurrence of chipping in discontinuous cutting of steel, for example.

As disclosed in Japanese Patent Provisional Publication No. 61-53,154, on the other hand, there are also known Al$_2$O$_3$-ZrO$_2$-MgO, Y$_2$O$_3$, CeO$_2$-TiC, TiN, TiCN and SiC ceramics, which tend however to easily chip when used for discontinuous cutting of steel.

In addition, Japanese Patent Provisional Publication No. 2-283,661 discloses α-Al$_2$O$_3$-CeO$_2$ceramics used as grinding grains for polishing.

Furthermore, Japanese Patent Provisional Publication No. 4-238,861 discloses ZrO$_2$-αAl$_2$O$_3$-β-Al$_2$O$_3$ ceramics. However, β-Al$_2$O$_3$ which takes the form of acicular grains, cannot be used as a matrix component material because of the content of from 3 to 10 vol. %.

A paper appearing in J. Am. Ceram. Soc., 73 [7] 2077-85 (1990) reports that addition of combinations of Na$_2$O and SiO$_2$, CaO and SiO$_2$ SrO and SiO$_2$ or BaO and SiO$_2$ to Al$_2$O$_3$ powder and sintering of the mixture causes abnormal grain growth of α-Al$_2$O$_3$ grains. The grains having abnormally grown have a plate-like shape with a particle size of over 100 μm and an aspect ratio of at least 5, according to the report.

OBJECTS AND SUMMARY OF THE INVENTION

The present invention relates to an α-Al$_2$O$_3$ based ceramic composite which is excellent in toughness and almost free from breakage or chipping of the cutting edge not only when continuously cutting steel or cast iron, but also when discontinuously cutting steel or cast iron, which requires a high toughness, displaying an excellent cutting performance.

In the present invention, strength and toughness of ceramics are improved by adding components controlling grain growth of α-Al$_2$O$_3$ platelets (hereinafter referred to as "Controllers") and additives promoting α-Al$_2$O$_3$ platelet formation (hereinafter referred to as "promoters") in trace amounts to α-Al$_2$O$_3$ matrix itself converted into platelet-shaped grains, and wear resistance is increased by coating the surface thereof with a hard layer.

DETAILED DESCRIPTION OF THE INVENTION

Figure 3:
FIG. 3 is a microstructural photograph of Al$_2$O$_3$-20 wt. % ZrO$_2$ added with 0.4 wt. % SrCO$_3$+0.3 wt. % SiO$_2$ sintered at 1,600° C. according to the present invention.

Recently, steps toward labor saving, factory automation and production of more general-purpose products have made much progress in the cutting processing area. Accordingly, there is a demand for the development of a tool which satisfy the requirement for a higher reliability under severer cutting conditions, not only through performance of both continuous and discontinuous cutting of steel, but also through discontinuous cutting of cast iron and combination thereof.

The present inventors have discovered the means for converting Al$_2$O$_3$ matrix itsself into platelet-shaped grains in place of dispersing SiC and other whiskers, and achieved the present invention as an application thereof particularly in the area of sintered ceramics for cutting tools.

The present inventors have successfully controlled for the first time, the size of α-Al$_2$O$_3$ particles to up to ten and several μm in the longitudinal direction by utilizing controllers which cause grain growth of α-Al$_2$O$_3$ into platelet-shaped grains, under the effect of promoters, which are added during sintering by adding the promoters and the controllers are added to a sinter comprising α-Al$_2$O$_3$ as the matrix. Addition of the promoters without adding the controllers considerably reduces the strength through abnormal grain growth of α-Al$_2$O$_3$ grains. Addition of the controllers permits control of the size of platelet α-Al$_2$O$_3$ grains in the longitudinal direction up to ten and several μm, and reduces the strength. The platelet α-Al$_2$O$_3$ grains inhibit propagation of cracks through deflection and grain bridging, thereby permitting remarkable improvement of fracture toughness without decreasing the strength.

Effective controllers include ZrO$_2$, HfO$_2$, partially stabilized ZrO$_2$; partially stabilized HfO$_2$, SiC grains, SiC whisker, and carbides, nitrides and carbonitrides of IVa, Va and VIa group metals.

Now, the mechanism is described below in detail while showing the manufacturing method for converting α-Al$_2$O$_3$ grains into platelet-shaped grains of the invention.

The method of the invention basically comprises the steps of mixing promoters (from 0.04 to 4 wt. % as converted into oxides) and various controllers (from 5 to 40 wt. %) into with ordinary aluminium oxide powder, and sintering the mixture at a temperature of at least 1,300° C. at which a liquid phase is sufficiently generated.

More specifically, addition of the above-mentioned promoters facilitates generation of the liquid phase in the sintering stage by reacting with Al$_2$O$_3$ during heating. Al$_2$O$_3$ is dissolved into this liquid phase, and the dissolved Al$_2$O$_3$ precipitates again on the surfaces of α-Al$_2$O$_3$ crystal grains. In the present invention, the following mechanism formed platelet-shaped grains.

The liquid phase, when produced, reduces the surface energy of the C-plane ((0001) plane) of α-Al$_2$O$_3$ crystal, thereby stabilizing this plane.

In order to reduce the energy of the entire α-Al$_2$O$_3$ grains, the grains must have wide stable planes and unstable planes must be reduced in area. α-Al$_2$O$_3$ grains are considered to grow as the C-plane becomes wider, thus leading to the production of α-Al$_2$O$_3$ grains.

When α-Al$_2$O$_3$ grains grow into platelet-shaped grains, the growth of platelets can be controlled with controllers. The platelets collide with the controllers: with a slight amount of added controllers, platelets grow while incorporating the controllers into grains, resulting in abnormal grain growth of the platelets.

By adding the controllers in an amount of at least 5 wt. %, it was possible to control the growth of platelets, i.e., the grain size, because the controllers are mainly distributed at grain boundaries.

In order to produce this mechanism, it is necessary to add from 0.02 to 2% one or more of oxides of alkali metals such as Li, Na and K and oxides of alkali earth metals such as Ca, Sr and Ba, and from 0.02 to 2% SiO$_2$ as the above-mentioned promoters. These additives suffice to be present in the form of oxides during sintering.

These components may, therefore, be added as oxides from the beginning, but may also be added by using salts which are decomposed during sintering into oxides from salts of chlorides, carbonates, nitrates, sulfates, oxalates and alkoxides of the above mentioned promoters.

This decomposing reaction may be separated, i.e., the above-mentioned compounds may be converted into oxides, through a heat treatment at a temperature ranging from 600° to 1,050° C. before sintering. After addition, mixing and formation of the controllers, sintering may be carried out.

The liquid-phase component may be produced by previously mixing the promoters and Al$_2$O$_3$ powder at a stage prior to the mixing step, causing a reaction at a high temperature ranging from about 1,000° to 1,500° C., grinding this provisional sinter of the liquid-phase component, and mixing this liquid-phase component, α-Al$_2$O$_3$ and various controlling components before sintering.

The liquid phase produced during sintering is vitrified or crystallized during cooling after sintering and is present at grain boundaries.

In sintering, the above-mentioned sinter is available by any of the method of sintering the shape at a temperature of from 1,300° to 1,900° C. in the air or in an inert gas atmosphere of in vacuum, the method of subjecting the sinter further to an HIP treatment at a temperature of from 1,300° to 1,700° C. under a pressure of from 100 to 200 MPa, and the method of hot-pressing the mixed powder at a temperature of from 1,300° to 1,900° C. under a pressure of from 10 to 40 MPa. Basically any amethod, which permits formation of the above-mentioned liquid phase. When appropriate, CIP and slip casting may be employed to manufacture a large-sized products such as a nozzle, a die, a rolling roll or an engineering ceramics.

Furthermore, wear resistance can be improved with the use of chemical vapor deposition by coating an object with a single or multiple-phase layer of solid-solution of one or more of such hard substances as oxides, carbides, carbonitrides and nitrides of aluminium and IVa, Va and VIa group metals.

Following are a brief description of the constituents of the present invention.

(a) Additives promoting α-Al$_2$O$_3$ platelet formation (promoters):

Effective additives promoting α-Al$_2$O$_3$ platelet formation (promoters) include one or more of oxides of Li, K, Na, Ca, Sr and Ba, and SiO$_2$, which react with part of Al$_2$O$_3$, form a liquid phase during sintering, and cause grain growth of α-Al$_2$O$_3$ grains into platelet grains. With an amount of each of such promoters of under 0.02 wt. % (0.04 wt. % in total), platelet α-Al$_2$O$_3$ grains do not grow because of the small amount of liquid phase. An amount of over 2 wt. % (4 wt. % in total) is not desirable particuflarly because of a decrease in strength and high-temperature hardness.

Figure 2:
FIG. 2 is a microstructural photograph of Al$_2$O$_3$-3 wt. % ZrO$_2$ added with 0.2 wt. % CaO+0.2 wt. % SiO$_2$ sintered at 1,600° C. as a comparative example.

(b) Components controlling grain growth of α-Al$_2$O$_3$ platelets (controllers):

Components controlling grain growth of α-Al$_2$O$_3$ platelets (controllers) control grain growth of α-Al$_2$O$_3$ platelets. Without addition of these components, abnormal grain growth of platelet α-Al$_2$O$_3$ grains is caused, resulting in a large decrease in strength. Even with controllers, a low content of under 5 wt. % causes α-Al$_2$O$_3$ grains to grow beyond the controllers. As shown in the photograph of FIG. 2, for example, representing a case of α-Al$_2$O$_3$-3 wt. % ZrO$_2$ added with a CaO and SiO$_2$ each in an amount of 0.2 wt. %, strength is still insufficient since platelet α-Al$_2$O$_3$ grains have a size of several tens of μm.

Controllers in amount over 40 wt. % produce insufficient growth of α-Al$_2$O$_3$ grains into platelets and results in a lower toughness. The controller content should, therefore, preferably be within a range of from 5 to 40 wt. %. It is also necessary that most of platelet α-Al$_2$O$_3$ grains have a longer diameter of up to 15 μm, to ensure sufficient strength and toughness.

Preferable controllers include ZrO$_2$ and HfO$_2$ grains, partially stablized ZrO$_2$ and partially stablized HfO$_2$ containing Y$_2$O$_3$, MgO, CaO and CeO$_2$, SiC whisker, carbides, carbonitrides and nitrides of IVa, Va and VIa group metals, and SiC particles.

(c) Addition of promoters and heat treatment temperature:

The promoter must be present in the form of oxides during sintering. The promoter may be added in the form of oxides or in the form of various salts. More specifically, the promoter may be oxides, chlorides, carbonates, nitrates and oxalates of Li, K, Na, Ca, Sr and Ba, oxides for Si, and alkoxide.

A heat treatment temperature of under 600° C. leads to insufficient decomposition into oxides. With a heat treatment temperature of over 1,050° C., powder particles condense among themselves, which form a defect after sintering, thus reducing strength of the sinter. The heat treatment temperature should therefore preferably be within a range of from 600° to 1,050° C. Al$_2$O$_3$ powder or all or part of the controllers may previously be mixed with compounds producing the promoters for the heat treatment.

A similar ceramics is available through preparation of this Al$_2$O$_3$ based ceramics by provisionally sintering a mixed powder of Al$_2$O$_3$ powder and at least one of oxides, chlorides, carbonates, nitrates, sulfates and oxalates of Li, K, Na, Ca, Sr and Ba and at least one of SiO$_2$ and/or Si alkoxide at a temperature of from 1,000° to 1,500° C. at which a liquid phase is produced to prepare a liquid phasse component, grinding this liquid-phase component, adding the ground powder, Al$_2$O$_3$ powder and controllers, mixing the same so as to achieve a chemical composition comprising from 0.04 to 4 wt. % promoters, from 5 to 40 wt. % controllers and the balance Al$_2$O$_3$, and sintering the resultant powder shape.

(d) Sintering:

The sintering atmosphere may be an oxidizing atmosphere such as air when using one or more oxides such as ZrO$_2$ and HfO$_2$ as the controllers, and must be an inert atmosphere such as vacuum or argon when using controllers poor in oxidation resistance (such as SiC, carbides, carbonitrides and nitrides of IVa, Va and VIa group metals), with a sintering temperature of under 1,300° C., sintering would be insufficient, and with a sintering temperature of over 1,900° C., excessive growth of α-Al$_2$O$_3$ grains largely reduces strength.

It is also possible to densify the product by subjecting the sinter to an HIP treatment, using an inert gas, at a temperature of from 1,300° to 1,700° C. under a pressure of from 100 to 200 MPa.

While hot-press sintering is applicable to any material, hot press sintering is required particularly when using SiC whisker as a controller because of the low sinterability thereof. A temperature of under 1,300° C. leads to an insufficient sintering, and a temperature of over 1,900° C. results in excessive growth of α-Al$_2$O$_3$ grains and hence a considerable decrease in strength. A press pressure of under 10 MPa leads to insufficient densification, whereas a pressure of over 40 MPa poses the problem of pressure resistance of the pressing die. (However, if a die having a high pressure resistance is developed, no problem would be posed up to the pressure resistance of that die.)

(e) Coating:

When the layer of Al$_2$O$_3$ and carbides, carbonitrides and nitrides of IVa, Va and VIa group metals has a thickness of under 1 μm, the effect of improving wear resistance is limited, and a layer thickness of over 20 μm is not desirable because of the easy occurrence of breakage or chipping.

The following is a brief synopsis of the present invention.

The present invention relates to an Al$_2$O$_3$ based ceramics in which α-Al$_2$O$_3$ grains appropriately grow into platelets by the addition of controllers and promoters, a method of manufacturing the same, and a ceramics having a coating layer on the surface thereof.

The Al$_2$O$_3$ based ceramic composite comprising platelet α-Al$_2$O$_3$ grains comprises substantially:

controllers: from 5 to 40 wt. %,
promoters: from 0.04 to 4 wt. %, and
α-Al$_2$O$_3$ and incidental impurities: balance.

In the sintering stage thereof, the promoters react with part of Al$_2$O$_3$ to produce a liquid phase which in turn produces platelet α-Al$_2$O$_3$ grains. Addition of the controllers permits control of the growth of platelet α-Al$_2$O$_3$ grains to up to 15 μm, and thus makes it possible to manufacture an Al$_2$O$_3$ based ceramic composite excellent in both strength and toughness. The promoters should preferably comprise one or more (from 0.02 to 2 wt. %) of oxides of Li, K, Na, Ca, Sr and Ba. The controllers comprise one or more of ZrO$_2$ powder, HfO$_2$ powder, partially stabilized ZrO$_2$ powder, partially stabilized HfO$_2$ powder, powder of carbides, nitrides and carbonitrides of IVa, Va and VIa group metals, SiC powder, and SiC whisker. The coating layer, having a thickness of from 1 to 20 μm, comprises a single or multiple layers of one or more of carbides, nitrides and carbonitrides of IVa, Va and VIa group metals, and Al$_2$O$_3$.

EXAMPLE 1

There were prepared Al$_2$O$_3$ powder having an average particle size of 0.3 μm as the raw material, powder of various compounds of Li, K, Na, Ca, Sr and Ba, SiO$_2$ powder and Si alkoxide, having an average particle size of from 0.1 to 5 μm as the promoters, and ZrO$_2$ powder, HfO$_2$ powder, and partially stabilized ZrO$_2$ powder and partially stabilized HfO$_2$ powder containing Y$_2$O$_2$ and CeO$_2$, having an average particle size of from 0.1 to 1 μm, as the controllers. First, the promoters were blended into Al$_2$O$_3$ powder at a ratio as shown in Table 1 (ratio to the overall mixture), and mixed for 72 hours on a ball mill. Then a heat treatment was applied under conditions as shown in Table 2 in the open air. Then, the controllers were blended at a ratio as shown in Table 1 (ratio to the overall mixture) and the blend was mixed on a ball mill for 72 hours and dried to obtain a mixed powder. The mixed powder was press-formed under a pressure of 1 ton/cm$^2$, and the formed mixture was sintered for one hour at a temperature as shown in Table 2, thereby preparing Al$_2$O$_3$-ZrO$_2$ based ceramic samples of the present invention.

For comparison purposes, furthermore, conventional Al$_2$O$_3$-ZrO$_2$ based ceramics were prepared, by using the above-mentioned Al$_2$O$_3$ powder, ZrO$_2$ powder, HfO$_2$ powder, and partially stabilized ZrO$_2$ powderl and partially stabilized HfO$_2$ powder containing Y$_2$O$_3$ and CeO$_2$ as raw material powders, and blending these raw material powders at aa blending ratio as shown in Table 1, under the same conditions as above except that no heat treatment was conducted and sintering was carried out at a temperature shown in Table 2.

For the resultant samples of ceramics, a discontinuous cutting test of steel was carried out under conditions:

Material to be cut: SCM440 (hardness: HB250) round bar with two longitudinal grooves,
Tool geometry: JIS SNGN120408,
Cutting speed: 400 m/min,
Depth of cut: 1 mm,
Feed: 0.15 mm/rev., and
Wet cutting time: 15 minutes, and a continuous cutting test of steel was conducted under conditions:

Material to be cut: SCM440 (hardness: HB250) round bar,
Tool geometry: JIS SNGN120408,
Cutting speed: 300 m/min,
Depth of cut: 1.5 mm,
Feed: 0.2 mm/rev., and
Wet cutting time: 10 minutes.

TABLE 1

| | Additives promoting α-Al₂O₃ platelet formation | | | | Components controlling the grain growth of α-Al₂O₃ platelets | |
|---|---|---|---|---|---|---|
| | Li,K,Na,Ca,Sr,Ba-compounds | | Si-compounds | | | |
| | Amount | Convert into oxide | Amount | Convert into oxide | Unstabilized and paartially stabilized $ZrO_2/HfO_2$ | $Al_2O_3$ |
| Ceramics of present invention | | | | | | |
| 1 | $BaCO_3$:0.5 | 0.33 | $Si(OCH_3)_4$:0.5 | 0.20 | $ZrO_2(Y_2O_3$:2 mol %):20 | Remainder |
| 2 | $SrCO_3$:0.4 | 0.23 | $SiO_2$:0.3 | 0.30 | $ZrO_2$:20 | Remainder |
| 3 | $Ba(NO_3)_2$:1 | 0.59 | $SiO_2$:0.2 | 0.20 | $HfO_2$:15 | Remainder |
| 4 | CaO:0.2 | 0.20 | $Si(OC_2H_5)_4$:0.4 $Si(OC_3H_7)_4$:0.4 | 0.21 | $ZrO_2$:20 | Remainder |
| 5 | $BaCl_2$:2.7 | 2.00 | $SiO_2$:1.5 | 1.50 | $ZrO_2(Y_2O_3$:2 mol %):15 | Remainder |
| 6 | $BaCO_3$:0.3,SrO:1.0 | 1.23 | $SiO_2$:0.2 | 0.20 | $ZrO_2(CeO_2$:12 mol %):20 | Remainder |
| 7 | $SrCO_3$:0.2,$BaCl_2$:0.2 | 0.26 | $SiO_2$:0.1 $Si(OC_2H_5)_4$:0.5 | 0.21 | $ZrO_2$:15 | Remainder |
| 8 | $SrCO_3$:0.2,$BaCl_2$:0.2 $Ca(NO_3)_2$:0.1 | 0.32 | $SiO_2$:0.2 | 0.20 | $ZrO_2(Y_2O_3$:3 mol %):5 $ZrO_2$:20 | Remainder |
| 9 | $CaCO_3$:0.1,SrO:0.1,$BaCl_2$:0.1 $Ba(NO_3)_2$:0.1 | 0.26 | $SiO_2$:0.3 | 0.30 | $ZrO_2$:25 | Remainder |
| 10 | $BaCO_3$:0.6 | 0.47 | $SiO_2$:0.3 | 0.30 | $ZrO_2$:5 | Remainder |
| 11 | $SrCO_3$:0.4 | 0.28 | $SiO_2$:0.2 | 0.20 | $ZrO_2(Y_2O_3$:3 mol %):40 | Remainder |
| 12 | $Na_2CO_3$:0.1,$SrCO_3$:0.3 | 0.27 | $SiO_2$:0.2 | 0.20 | $ZrO_2$:20 | Remainder |
| 13 | $LiNO_3$:0.09 | 0.02 | $SiO_2$:0.2 | 0.20 | $HfO_2(Y_2O_3$:3 mol %):20 | Remainder |
| 14 | $BaSO_4$:0.2,$CaCO_3$:0.2 | 0.24 | $SiO_2$:0.3 | 0.30 | $HfO_2$:5,$ZrO_2$:5 | Remainder |
| 15 | $BaC_2O_4 H_2O$:0.4 | 0.25 | $SiO_2$:0.2 | 0.20 | $ZrO_2$:20 | Remainder |
| Conventional ceramics | | | | | | |
| 1 | — | — | — | — | $ZrO_2(CeO_2$:10 mol %):5 | Remainder |
| 2 | — | — | — | — | $ZrO_2$:20 | Remainder |
| 3 | — | — | — | — | $ZrO_2(Y_2O_3$:3 mol %):40 | Remainder |
| 4 | — | — | — | — | $HfO_2$:20 | Remainder |

TABLE 2

| | Heat treatment | | Sintering | Flank wear (mm) | | α-Al₂O₃ grain morphology | | Bending strength | Fracture toughness |
|---|---|---|---|---|---|---|---|---|---|
| | Temperature (°C.) | Time (Hr) | temperature (°C.) | Interrupt | Continuous | Shape | Size (μm) | (MPa) | (MPa m$^{\frac{1}{2}}$) |
| Ceramics of present invention | | | | | | | | | |
| 1 | 800 | 1 | 1600 | 0.23 | 0.20 | Platelet | 4 | 700 | 6.0 |
| 2 | 800 | 1 | 1600 | 0.22 | 0.18 | Platelet | 3 | 710 | 6.2 |
| 3 | 800 | 1 | 1600 | 0.26 | 0.17 | Platelet | 6 | 800 | 5.6 |
| 4 | 600 | 1 | 1500 | 0.25 | 0.21 | Platelet | 2 | 1000 | 5.2 |
| 5 | 900 | 1 | 1700 | 0.31 | 0.29 | Platelet | 10 | 860 | 5.2 |
| 6 | 800 | 1 | 1600 | 0.28 | 0.24 | Platelet | 4 | 800 | 5.3 |
| 7 | 900 | 1 | 1600 | 0.27 | 0.21 | Platelet | 4 | 800 | 5.3 |
| 8 | 800 | 1 | 1600 | 0.25 | 0.21 | Platelet | 3 | 710 | 5.8 |
| 9 | 800 | 1 | 1500 | 0.24 | 0.18 | Platelet | 2 | 850 | 6.0 |
| 10 | 900 | 2 | 1500 | 0.27 | 0.26 | Platelet | 3 | 780 | 5.2 |
| 11 | 800 | 1 | 1600 | 0.24 | 0.22 | Platelet | 2 | 850 | 5.0 |
| 12 | 650 | 1 | 1450 | 0.24 | 0.23 | Platelet | 2 | 700 | 5.3 |
| 13 | 700 | 1 | 1300 | 0.26 | 0.24 | Platelet | 2 | 680 | 5.2 |
| 14 | 800 | 1 | 1700 | 0.24 | 0.25 | Platelet | 15 | 800 | 5.8 |
| 15 | 1000 | 2 | 1600 | 0.25 | 0.24 | Platelet | 4 | 750 | 5.6 |
| Conventional ceramics | | | | | | | | | |
| 1 | — | — | 1500 | Fractured in 2 min. | 0.24 | Equiaxed | 2 | 450 | 3.2 |
| 4 | — | — | 1600 | Fractured in 7 min. | 0.19 | Equiaxed | 2 | 600 | 4.3 |
| 5 | — | — | 1600 | Fractured in 3 min. | 0.19 | Equiaxed | 1 | 800 | 4.5 |
| 6 | — | — | 1600 | Fractured in 5 min. | 0.21 | Equiaxed | 3 | 650 | 4.3 |

The worn width on the relief face of the cutting edge was measured in the both tests. The results of tests are shown in Table 2. Table 2 also shows the shape, particle size, bending strength and fracture toughness of α-Al₂O₃ grains.

Figure 1:
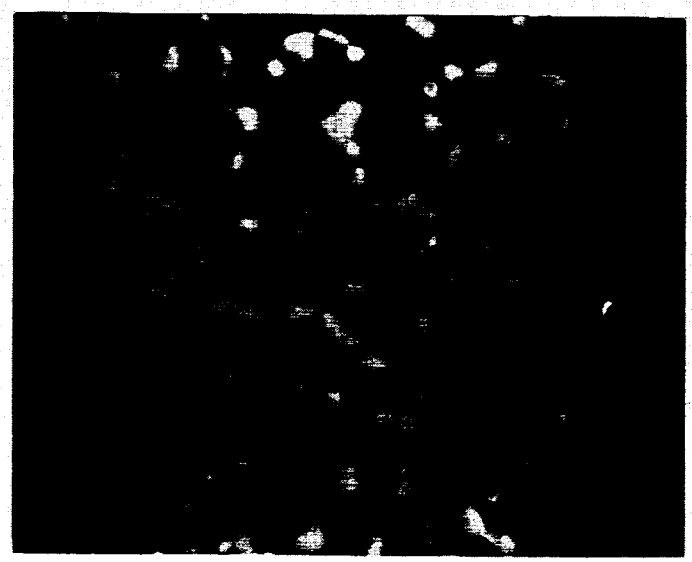
FIG. 1 is a microstructural photograph of conventional Al$_2$O$_3$-ZrO$_2$ ceramics.

FIGS. 1 and 3 respectively show structural photographs of the conventional ceramics 2 and the ceramics 2 of the present invention based on a scanning-type electron microscope.

As shown in FIGS. 1 and 3, while the samples of the invention exhibit a mixed structure mainly comprising platelet Al₂O₃ crystal grains (gray) and equiaxed ZrO₂ crystal grains (white), the conventional samples demonstrate a mixed structure of equiaxed Al₂O₃ and equiaxed ZrO₂ crystal grains, thus clearly revealing the difference in structure between these samples. This structural difference is reflected in toughness: as shown in Table 2, the samples of the invention have a far superior toughness to the conventional ones. Accordingly, although these groups of samples show similar cutting properties in continuous cutting steel, in discontinuous cutting of steel, all the conventional samples suffered damages to the cutting edge with a relatively short service life, whereas the samples of the invention were free from occurrence of breakage or chipping in the cutting edge and displayed an excellent wear resistance for a along period of time.

EXAMPLE 2

Mixed powders were obtained by using the same raw materials as in the Example 1, blending these raw materials at a ratio shown in Table 3, mixing the same on a ball mill for 72 hours and drying the same. $Al_2O_3$-$ZrO_2$ based ceramic samples of the present invention were prepared by press-forming the mixed powders under a pressure of 1 ton/cm$^2$ and sintering the formed powders in the open air for one hour at a temperature shown in Table 4.

For comparison purposes, conventional $Al_2O_3$-$ZrO_2$ based ceramic samples were prepared in the same manner as in Example 1.

For the resulting samples of ceramics, cutting tests were carried out under the same conditions as in the Example 1. The results are shown in Table 4. The shape, particle size, bending strength and fracture toughness of $\alpha$-$Al_2O_3$ grains are also shown in Table 4.

As shown in Table 4, the samples of the invention have a far superior toughness to that of the conventional samples. Accordingly, although these groups of samples show similar cutting properties in continuous cutting of steel, in discontinuous cutting of steel, all the conventional samples suffered damages to the cutting edge with a relatively short service life, whereas the samples of the invention were free from breakage or chipping in the cutting edge and displayed an excellent wear resistance for a long period of time.

EXAMPLE 3

There were prepared $Al_2O_3$ powder, having an average particle size of 0.3 μm as the raw material, powder of various compounds of Li, K, Na, Ca, Sr and Ba, $SiO_2$ powder and Si alkoxide, having an average particle size of from 0.1 to 5 μm as the promoters, and $ZrO_2$ powder, $HfO_2$ powder, partially stabilized $ZrO_2$ powder and partially stabilized $HfO_2$ powder containing $Y_2O_3$ and $CeO_2$, carbide powder, nitride powder, and carbonitride powder of IVa, Va and VIa group metals, having an average particle size of from 0.1 to 1 μm, as the controllers.

TABLE 3

| | Blending composition (% by weight) | | | | Components controlling the grain growth of $\alpha$-$Al_2O_3$ platelets | |
|---|---|---|---|---|---|---|
| | Additives promoting $\alpha$-$Al_2O_3$ platelet formation | | | | | |
| | Li,K,Na,Ca,Sr,Ba-compounds | | SiO$_2$ | | Unstabilized and partially | |
| | Amount | Convert into oxide | Amount | Convert into oxide | stabilized $ZrO_2$/$HfO_2$ | $Al_2O_3$ |
| | Ceramics of present invention | | | | | |
| 1 | $CaCO_3$:0.05 | 0.02 | 0.02 | 0.02 | $ZrO_2$:10 | Remainder |
| 2 | BaO:2 | 2.00 | 1.5 | 1.50 | $ZrO_2$:15 | Remainder |
| 3 | SrO:0.3 | 0.30 | 0.2 | 0.20 | $HfO_2$:15 | Remainder |
| 4 | $CaCO_3$:0.1,$Ca(NO_3)_2$:0.1 | 0.07 | 0.2 | 0.20 | $ZrO_2$:10,$HfO_2$:10 | Remainder |
| 5 | BaO:0.2,$CaCl_2$:0.1 | 0.25 | 0.2 | 0.20 | $HfO_2$:20 | Remainder |
| 6 | $CaCO_3$:0.1,CaO:0.1,$Ca(NO_3)_2$:0.1 | 0.19 | 0.1 | 0.10 | $ZrO_2$:25 | Remainder |
| 7 | $K_2SO_4$:0.1 | 0.05 | 0.3 | 0.30 | $ZrO_2$:5 | Remainder |
| 8 | $Li_2NO_3$:0.1,$Na_2SO_4$:0.1 | 0.07 | 0.1 | 0.10 | $ZrO_2$($CeO_2$:12 mol %):30 | Remainder |
| 9 | $Na_2CO_3$:0.1 | 0.06 | 0.1 | 0.10 | $ZrO_2$($Y_2O_3$:3 mol %):20 | Remainder |

TABLE 4

| | Sintering temperature (°C.) | Flank wear (mm) | | $\alpha$-$Al_2O_3$ grain molphology | | Bending strength (MPa) | Fracture toughness (MPa m$^{\frac{1}{2}}$) |
|---|---|---|---|---|---|---|---|
| | | Interrupt | Continuous | Shape | Size (μm) | | |
| | Ceramics of present invention | | | | | | |
| 1 | 1600 | 0.30 | 0.22 | Platelet | 4 | 790 | 5.7 |
| 2 | 1600 | 0.26 | 0.29 | Platelet | 4 | 810 | 5.5 |
| 3 | 1600 | 0.28 | 0.17 | Platelet | 4 | 820 | 5.3 |
| 4 | 1600 | 0.24 | 0.20 | Platelet | 3 | 710 | 5.6 |
| 5 | 1500 | 0.24 | 0.19 | Platelet | 4 | 1050 | 5.7 |
| 6 | 1500 | 0.22 | 0.20 | Platelet | 2 | 950 | 5.4 |
| 7 | 1400 | 0.27 | 0.28 | Platelet | 10 | 700 | 5.0 |
| 8 | 1600 | 0.24 | 0.27 | Platelet | 3 | 760 | 5.5 |
| 9 | 1300 | 0.24 | 0.26 | Platelet | 4 | 730 | 5.2 |

First, the controllers were blended into Al O powder at a ratio as shown in Table 5 (ratio to the overall mixture) 1, and mixed for 72 hours on a ball mill. Then, a heat treatment was applied under conditionsd as shown in Table 6 in the open air. Then, the controllers were blended at a ratio as shown in Table 5 (ratio to the overall mixture), and the blend was mixed on a ball mill for 72 hours and dried to obtain a mixed powder. The mixed powder was press-formed under a pressure of 1 ton/cm, and the formed mixture was sintered in an inert gas atmosphere for one hour at a temperature as shown in Table 6. In addition, an HIP treatment was conducted in argon gas at 1,500° C. under a pressure of 150 MPa for an hour, thereby preparing $Al_2O_3$ based ceramic composite of the present invention.

For comparison purposes, furthermore, conventional $Al_2O_3$ based ceramic composite were prepared, by using the above-mentioned $ZrO_2$ powder, $HfO_2$ powder, partially stabilized $ZrO_2$ powder and partially stabilized $HfO_2$ powder containing $Y_2O_3$ and $CeO_2$, carbide powder, nitride powder and carbonitride powder of IVa, Va and VIa group metals, SiC powder and $Al_2O_3$ powder as raw material powders, blending these raw material powders at a blending ratio as shown in Table 5, sintering the same without applying a heat treatment under conditions as shown in Table 6, and carrying out an HIP treatment under the same conditions.

For the resultant samples of ceramics, a continuous cutting test of steel was carried out under conditions:

Material to be cut: SCM440 (hardness: HB250) round bar,
Tool geometry: JIS SNGN 120408
Cutting speed: 350 m/min,
Depth of cut: 1 mm,
Feed: 0.2 mm/rev., and
Wet cutting time: 10 minutes,
and the worn width of the relief face of the cutting edge was measured.

ping in continuous cutting of steel and display excellent wear resistance for a long period of time.

EXAMPLE 4

There were prepared $Al_2O_3$ powder, having an average particle size of 0.3 μm, as the raw material, powder of various compounds of Li, K, Na, Ca, Sr and Ba, $SiO_2$ powder and Si alkoxide, having an average particle size of from 0.1 to 5 μm, as the promoters, and SiC

TABLE 5

| | Blending composition (% by weight) | | | | | | |
|---|---|---|---|---|---|---|---|
| | Additives promotiong α-$Al_2O_3$ platelet formation | | | | Components controlling the grain growth of α-$Al_2O_3$ platelets | | |
| | Li,K,Na,Ca,Sr,Ba-compounds | | Si-compounds | | | | |
| | Amount | Convert into oxide | Amount | Convert into oxide | Unstabilized and partially stabilized $ZrO_2/HfO_2$ | IVa,Va,VIa metal compounds and SiC | $Al_2O_3$ |
| | Ceramics of present invention | | | | | | |
| 1 | $BaCO_3$:0.5 | 0.39 | $SiO_2$:0.3 | 0.30 | $ZrO_2(Y_2O_3$:3 mol %):15 | TiCN:10 | Remainder |
| 2 | $Ba(NO_3)_2$:1 | 0.59 | $Si(OC_3H_7)_4$:0.7 | 0.16 | $ZrO_2$:20 | TiC:5 | Remainder |
| 3 | CaO:0.2 | 0.20 | $Si(OC_2H_5)_4$:0.7 | 0.20 | $ZrO_2$:10 | WC:8 | Remainder |
| 4 | BaO:2.0 | 2.00 | $SiO_2$:2 | 2.00 | $HfO_2$:10 | TiCN:10 | Remainder |
| 5 | $BaCO_3$:0.4,$Ba(NO_3)_2$:0.2 | 0.43 | $SiO_2$:0.2 | 2.20 | $ZrO_2$:20 | TiC:10,TiN:5 | Remainder |
| 6 | $SrCO_3$:0.2,CaO:0.1 | 0.24 | $SiO_2$:0.4 | 0.40 | $ZrO_2$:10 | ZrCN:10 | Remainder |
| 7 | $Na_2CO_3$:0.5 | 0.29 | $SiO_2$:0.4 | 0.40 | $HfO_2$:10 | TiCN:10 | Remainder |
| 8 | $K_2SO_4$:0.4,$SrCO_3$:0.1 | 0.29 | $SiO_2$:0.4 | 0.40 | $ZrO_2(CeO_2$:12 mol %):20 | TiN:20 | Remainder |
| 9 | $SrCO_3$:0.5 | 0.35 | $SiO_2$:0.5 | 0.50 | — | SiC:20 | Remainder |
| 10 | $BaC_2O_4 H_2O$:0.4 | 0.25 | $SiO_2$:0.2 | 0.20 | $ZrO_2$:10 | TiCN:20 | Remainder |
| 11 | $CaCO_3$:0.3 | 0.17 | $SiO_2$:0.2 | 0.20 | — | ZrCN:25 | Remainder |
| 12 | CaO:0.3 | 0.30 | $SiO_2$:0.2 | 0.20 | — | TaC:20 | Remainder |
| 13 | $LiNO_3$:0.2 | 0.04 | $SiO_2$:0.03 | 0.03 | $ZrO_2$:10 | TiCN:10,SiC:10 | Remainder |
| 14 | $K_2SO_4$:0.1,$Na_2SO_4$:0.1 | 0.09 | $SiO_2$:0.3 | 0.30 | — | TiCN:5 | Remainder |
| | Conventional ceramics | | | | | | |
| 1 | — | — | — | — | $ZrO_2$:10 | TiCN:10 | Remainder |
| 2 | — | — | — | — | $ZrO_2(Y_2O_3$:2 mol %):15 | TiN:10 | Remainder |
| 3 | — | — | — | — | $HfO_2$:10 | SiC:10 | Remainder |
| 4 | — | — | — | — | $ZrO_2$:15 | TiN:5,TiCN:5,SiC:5 | Remainder |
| 5 | — | — | — | — | — | TiCN:30 | Remainder |
| 6 | — | — | — | — | — | ZrC:15 | Remainder |

TABLE 6

| | Heat treatment | | Sintering | Flank | α-$Al_2O_3$ | | Bending | Fracture |
|---|---|---|---|---|---|---|---|---|
| | Temperature (°C.) | Time (Hr) | temperature (°C.) | wear (mm) | grain morphology | | strength (MPa) | toughness (MPa m$^{\frac{1}{2}}$) |
| | | | | | Shape | Size (μm) | | |
| | Ceramics of present invention | | | | | | | |
| 1 | 800 | 1 | 1800 | 0.32 | Platelet | 4 | 800 | 5.5 |
| 2 | 800 | 1 | 1650 | 0.27 | Platelet | 2 | 800 | 6.5 |
| 3 | 600 | 2 | 1700 | 0.28 | Platelet | 4 | 750 | 5.3 |
| 4 | 700 | 1 | 1700 | 0.34 | Platelet | 4 | 710 | 6.0 |
| 5 | 900 | 1 | 1700 | 0.30 | Platelet | 2 | 850 | 6.4 |
| 6 | 800 | 1 | 1900 | 0.32 | Platelet | 7 | 740 | 5.1 |
| 7 | 700 | 1 | 1600 | 0.32 | Platelet | 3 | 720 | 5.5 |
| 8 | 800 | 2 | 1650 | 0.34 | Platelet | 1 | 780 | 5.7 |
| 9 | 800 | 1 | 1750 | 0.33 | Platelet | 2 | 750 | 5.1 |
| 10 | 1050 | 1 | 1650 | 0.29 | Platelet | 1 | 800 | 6.0 |
| 11 | 700 | 1 | 1850 | 0.31 | Platelet | 2 | 750 | 5.2 |
| 12 | 600 | 1 | 1850 | 0.32 | Platelet | 2 | 760 | 5.0 |
| 13 | 700 | 1 | 1750 | 0.32 | Platelet | 1 | 740 | 5.3 |
| 14 | 800 | 1 | 1700 | 0.33 | Platelet | 13 | 780 | 5.4 |
| | Conventional ceramics | | | | | | | |
| 1 | — | — | 1850 | Fractured in 5 min. | Equiaxed | 3 | 700 | 3.8 |
| 2 | — | — | 1850 | Fractured in 4 min. | Equiaxed | 3 | 760 | 3.8 |
| 3 | — | — | 1850 | Fractured in 6 min. | Equiaxed | 2 | 720 | 4.2 |
| 4 | — | — | 1800 | Fractured in 6 min. | Equiaxed | 1 | 720 | 4.0 |
| 5 | — | — | 1750 | Fractured in 3 min. | Equiaxed | 1 | 700 | 3.5 |
| 6 | — | — | 1700 | Fractured in 4 min. | Equiaxed | 2 | 720 | 4.2 |

The results are shown in Table 6. Table 6 also shows the shape, particle size, bending strength and fracture toughness of α-$Al_2O_3$ grains.

As shown in Table 6, the ceramics of the present invention, having a structure in which $Al_2O_3$ grains have grown into platelets, are clearly superior in toughness, and this is reflected in the fact that the ceramics of the present invention are free from breakage or chip-whisker containing at least 70% whiskers of an aspect ratio of from 35 to 40 with a length of from 15 to 50 μm and a diameter of from 0.4 to 2 μm, as the controllers. First, the promoters were blended into $Al_2O_3$ powder at a ratio as shown in Table 7 (ratio to the overall mixture), and the mixture was mixed for 72 hours on a ball mill.

Then, a heat treatment was applied in the air under conditions as shown in Table 8, and the heat-treated mixture was converted into slurry on a wet ball mill. Then, SiC whisker was blended at a ratio shown in Table 7 (ratio to the overall mixture), and wet-mixed for two hours by means of ultrasonic waves and mechanical mixture. After drying, the mixture was hot-pressed under conditions shown in Table 8, thereby preparing an $Al_2O_3$ based ceramic composite of the present invention.

For comparison purposes, furthermore, conventional $Al_2O_3$ based ceramic composites were prepared by using the above-mentioned $Al_2O_3$ powder and SiC whisker, mixing these raw material powders under the same conditions so as to achieve the blending composition as shown in Table 7, and hot-pressing the mixture under conditions as shown in Table 8, thereby preparing conventional $Al_2O_3$ based ceramic composites.

Subsequently, a milling test of cast iron was carried out on the thus obtained samples of various ceramics under conditions:
Material to be cut: FC30 (hardness: HB220),
Tool geometry: JIS SNGN 120408,
Cutting speed: 300 m/min,
Depth of cut: 1 mm,
Feed: 0.2 mm/rev., and
Wet cutting time: 20 minutes,
and the worn width of the relief face of the cutting edge was measured. The results are shown in Table 8. The shape, particle size, bending strength and fracture toughness of $\alpha$-$Al_2O_3$ grains are also shown in Table 8.

As is clear from Table 8, the ceramics of the present invention, having a structure in which $Al_2O_3$ grains have grown into platelets, have a strength of the same order as that of the conventional ceramics, but are superior in toughness, and this is reflected in the fact that the

TABLE 7

| | Blending composition (% by weight) | | | | | |
|---|---|---|---|---|---|---|
| | Additives promoting $\alpha$-$Al_2O_3$ platelet formation | | | | Components controlling the grain | |
| | Li,K,Na,Ca,Sr,Ba-compounds | | Si-compounds | | growth of $\alpha$-$Al_2O_3$ platelets | |
| | Amount | Convert into oxide | Amount | Convert into oxide | SiC whisker | $Al_2O_3$ |
| | Ceramics of present invention | | | | | |
| 1 | $CaCO_3$:0.05 | 0.02 | $Si(OC_2H_5)_4$:0.4 | 0.05 | 5 | Remainder |
| 2 | $BaCO_3$:0.5 | 0.39 | $SiO_2$:0.2 | 0.20 | 10 | Remainder |
| 3 | $SrCO_3$:0.4 | 0.28 | $SiO_2$:0.3 | 0.30 | 15 | Remainder |
| 4 | $Ca(NO_3)_2$:0.15 | 0.05 | $SiO_2$:0.02 | 0.02 | 20 | Remainder |
| 5 | $CaCl_2$:0.5 | 0.25 | $SiO_2$:0.1,$Si(OC_3H_7)_4$:0.3 | 0.17 | 20 | Remainder |
| 6 | BaO:2 | 2.00 | $SiO_2$:2 | 2.00 | 30 | Remainder |
| 7 | SrO:1 | 1.00 | $SiO_2$:1.0 | 1.00 | 20 | Remainder |
| 8 | $BaCO_3$:0.4,$SrCl_2$:0.2 | 0.44 | $SiO_2$:0.2 | 0.20 | 35 | Remainder |
| 9 | $SrCO_3$:0.1,CaO:0.1,$Ba(NO_3)_2$:0.1 | 0.23 | $SiO_2$:0.2 | 0.20 | 25 | Remainder |
| 10 | $K_2SO_4$:0.1 | 0.05 | $SiO_2$:0.2 | 0.20 | 25 | Remainder |
| 11 | $Na_2CO_3$:0.1,$SrCO_3$:0.1 | 0.13 | $SiO_2$:0.2 | 0.20 | 20 | Remainder |
| 12 | $LiNO_3$:0.1 | 0.02 | $SiO_2$:0.1 | 0.10 | 25 | Remainder |
| 13 | $BaC_2O_4 \cdot H_2O$:2 | 1.26 | $SiO_2$:1.0 | 1.00 | 40 | Remainder |
| 14 | $NaNO_3$:0.5 | 0.18 | $SiO_2$:0.2 | 0.20 | 25 | Remainder |
| 15 | $LiNO_3$:0.05,$NaNO_3$:0.05 | 0.03 | $SiO_2$:0.1 | 0.10 | 25 | Remainder |
| | Conventional ceramics | | | | | |
| 1 | — | — | — | — | 5 | Remainder |
| 2 | — | — | — | — | 17 | Remainder |
| 3 | — | — | — | — | 30 | Remainder |
| 4 | — | — | — | — | 40 | Remainder |

TABLE 8

| | Heat treatment | | Hot pressing | | | Flank wear (mm) | $\alpha$-$Al_2O_3$ grain morphology | | Bending strength (MPa) | Fracture toughness (MPa m$^{\frac{1}{2}}$) |
|---|---|---|---|---|---|---|---|---|---|---|
| | Temperature (°C.) | Time (Hr) | Temperature (°C.) | Pressure (MPa) | Time (Hr) | | Shape | Size (μm) | | |
| | Ceramics of present invention | | | | | | | | | |
| 1 | 800 | 1 | 1550 | 30 | 1 | 0.31 | Platelet | 13 | 760 | 6.6 |
| 2 | 800 | 1 | 1700 | 30 | 1 | 0.32 | Platelet | 10 | 800 | 7.3 |
| 3 | 800 | 1 | 1750 | 30 | 1 | 0.28 | Platelet | 7 | 820 | 7.0 |
| 4 | 900 | 1 | 1750 | 30 | 1 | 0.31 | Platelet | 5 | 800 | 7.2 |
| 5 | 800 | 1 | 1800 | 30 | 1 | 0.32 | Platelet | 4 | 820 | 7.2 |
| 6 | 1000 | 2 | 1850 | 30 | 2 | 0.34 | Platelet | 2 | 880 | 7.5 |
| 7 | 800 | 1 | 1750 | 30 | 1 | 0.34 | Platelet | 2 | 800 | 7.2 |
| 8 | 800 | 1 | 1800 | 30 | 2 | 0.30 | Platelet | 2 | 750 | 7.4 |
| 9 | 800 | 1 | 1700 | 30 | 2 | 0.28 | Platelet | 3 | 840 | 7.2 |
| 10 | 800 | 1 | 1750 | 40 | 1 | 0.30 | Platelet | 3 | 780 | 7.2 |
| 11 | 800 | 1 | 1700 | 20 | 1 | 0.31 | Platelet | 5 | 790 | 7.3 |
| 12 | 800 | 2 | 1750 | 30 | 1 | 0.29 | Platelet | 4 | 820 | 7.5 |
| 13 | 800 | 1 | 1750 | 30 | 1 | 0.32 | Platelet | 2 | 800 | 7.5 |
| 14 | 700 | 1 | 1750 | 30 | 1 | 0.30 | Platelet | 3 | 860 | 7.6 |
| 15 | 800 | 1 | 1750 | 30 | 1 | 0.33 | Platelet | 3 | 850 | 7.5 |
| | Conventional ceramics | | | | | | | | | |
| 1 | — | — | 1750 | 30 | 1 | Fractured in 10 min. | Equiaxed | 10 | 750 | 5.0 |
| 2 | — | — | 1750 | 30 | 2 | Fractured in 12 min. | Equiaxed | 5 | 780 | 5.5 |
| 3 | — | — | 1750 | 30 | 2 | Fractured in 18 min. | Equiaxed | 3 | 800 | 6.0 |
| 4 | — | — | 1750 | 40 | 2 | Fractured in 16 min. | Equiaxed | 2 | 720 | 6.5 | ceramics of the present invention are free of breakage or chipping in discontinuous cutting of cast iron and display excellent wear resistance for a long period of time.

EXAMPLE 5

There were prepared $Al_2O_3$ powder, having an average particle size of 0.3 μm, as the raw material, powder of various compounds of Li, K, Na, Ca, Sr and Ba, $SiO_2$ powder, and Si alkoxide, having an average particle size of from 0.1 to 5 μm, as the promoters, and $ZrO_2$ powder, $HfO_2$ powder, partially stabilized $ZrO_2$ powder and partially stabilized $HfO_2$ powder containing $Y_2O_3$ and $CeO_2$, having an average particle size of from 0.1 to 1 μm, and SiC whisker, having a length of from 15 to 59 μm and a diameter of from 0.4 to 2 μm and containing at least 70% whiskers of an aspect ratio of from 35 to 40 as the controllers. Samples of the $Al_2O_3$ based ceramic composite of the present invention were prepared by first blending the promoters into $Al_2O_3$ powder at a ratio shown in Table 9 (ratio to the overall mixture), mixing the same on a ball mill for 72 hours, then carrying out a heat treatment in the air under conditions as shown in Table 10, then blending $ZrO_2$ powder, $HfO_2$ powder, and partially stabilized $ZrO_2$ powder and partially stabilized $HfO_2$ powder containing $Y_2O_3$ and $CeO_2$ into the heat-treated mixture, mixing the same on a wet ball mill for 24 hours into slurry, blending SiC whisker at a ratio shown in Table 9, wet-mixing the same for two hours by means of ultrasonic waves and mechanical mixing, and after drying, hot-pressing the same under conditions as shown in Table 10.

For comparison purposes, furthermore, samples of the conventional $Al_2O_3$ based ceramic composite were prepared by using the above-mentioned $Al_2O_3$ powder, $ZrO_2$ powder, $HfO_2$ powder, partially stabilized $ZrO_2$ powder and partially stabilized $HfO_2$ powder containing $Y_2O_3$ and $CeO_2$, and SiC whisker as the raw material powders, mixing these raw material powders under the same conditions so as to achieve a blended composition as shown in Table 9, and hot-pressing the blend under conditions as shown in Table 10 without applying a heat treatment.

Subsequently, a cast iron milling test was carried out under the same conditions as in the Example 4 for the thus obtained samples of the various ceramics. The results are shown in Table 10. The shape, particle size, bending strength and fracture toughness of $\alpha$-$Al_2O_3$ grains are also shown in Table 10.

As is clear from Table 10, the ceramics of the present invention, having a structure in which $Al_2O_3$ grains have grown into platelets, have a strength of the same order as that of the conventional ceramics, but are superior in toughness, and this is reflected in the fact that the ceramics of the present invention are free from occurrence of breakage or chipping in wet milling of cast iron and display excellent wear resistance for a long period of time.

TABLE 9

| | Blending composition (% by weight) | | | | | |
|---|---|---|---|---|---|---|
| | Additives promoting $\alpha$-$Al_2O_3$ platelet formation | | | | Components controlling the grain growth of $\alpha$-$Al_2O_3$ platelets | |
| | Li,K,Na,Ca,Sr,Ba-compounds | | Si-compounds | | | |
| | Amount | Convert into oxide | Amount | Convert into oxide | Unstabilized and partially stabilized $ZrO_2$/$HfO_2$ | SiC whisker | $Al_2O_3$ |
|---|---|---|---|---|---|---|---|
| | Ceramics of present invention | | | | | | |
| 1 | $CaCO_3$:0.05 | 0.02 | $SiO_2$:0.02 | 0.02 | $ZrO_2$:5 | 30 | Remainder |
| 2 | $SrCO_3$:0.4 | 0.28 | $Si(OC_2H_5)_4$:0.5 | 0.14 | $ZrO_2(Y_2O_3$:2 mol %):30 | 5 | Remainder |
| 3 | $Ba(NO_3)_2$:0.4 | 0.23 | $SiO_2$:0.1,$Si(OCH_3)_4$:0.1 $Si(OC_2H_5)_4$:0.1 | 0.17 | $ZrO_2$:10 $ZrO_2(Y_2O_3$:2 mol %):5 | 20 | Remainder |
| 4 | $BaCl_2$:0.7 | 0.52 | $SiO_2$:0.5 | 0.50 | $ZrO_2(CeO_2$:12 mol %):10 $ZrO_2(Y_2O_3$:3 mol %):10 | 20 | Remainder |
| 5 | $SrCl_2$:0.5 | 0.33 | $SiO_2$:0.2 | 0.20 | $ZrO_2$:15 | 25 | Remainder |
| 6 | BaO:1 | 1.00 | $SiO_2$:1.0 | 1.00 | $ZrO_2$:15 | 25 | Remainder |
| 7 | SrO:1 | 1.00 | $SiO_2$:1.0 | 1.00 | $ZrO_2$:5 | 25 | Remainder |
| 8 | $BaCO_3$:2.0,CaO:0.4 | 2.00 | $SiO_2$:2.0 | 2.00 | $HfO_2$:15 | 25 | Remainder |
| 9 | $SrCO_3$:0.1,$Sr(NO_3)_2$:0.1,$SrCl_2$:0.1 | 0.18 | $SiO_2$:0.3 | 0.30 | $ZrO_2$:10 | 25 | Remainder |
| 10 | $Na_2CO_3$:0.1 | 0.06 | $SiO_2$:0.1 | 0.10 | $ZrO_2$:15 | 25 | Remainder |
| 11 | $LiNO_3$:0.2 | 0.04 | $SiO_2$:0.05 | 0.05 | $ZrO_2$:15 | 20 | Remainder |
| 12 | $K_2SO_4$:0.1,$SrCO_3$:0.1 | 0.12 | $SiO_2$:0.2 | 0.20 | $HfO_2$:20 | 15 | Remainder |
| 13 | $BaC_2O_4$ $H_2O$:1.0 | 0.63 | $SiO_2$:1.0 | 1.00 | $ZrO_2$:15 | 25 | Remainder |
| 14 | $Li_2SO_4$:0.1,$Na_2SO_4$:0.05 | 0.06 | $SiO_2$:0.05 | 0.05 | $ZrO_2(Y_2O_3$:3 mol %):15 | 25 | Remainder |
| | Conventional ceramics | | | | | | |
| 1 | — | — | — | — | $ZrO_2$:5 | 30 | Remainder |
| 2 | — | — | — | — | $ZrO_2(Y_2O_3$:2 mol %):30 | 5 | Remainder |
| 3 | — | — | — | — | $HfO_2$:15 | 15 | Remainder |
| 4 | — | — | — | — | $ZrO_2(CeO_2$:12 mol %):15 | 15 | Remainder |

TABLE 10

| | Heat treatment | | Hot pressing | | | Flank wear (mm) | $\alpha$-$Al_2O_3$ grain morphology | | Bending strength (MPa) | Fracture toughness (MPa m$^{\frac{1}{2}}$) |
|---|---|---|---|---|---|---|---|---|---|---|
| | Temperature (°C.) | Time (Hr) | Temperature (°C.) | Pressure (MPa) | Time (Hr) | | Shape | Size (μm) | | |
| | Ceramics of present invention | | | | | | | | | |
| 1 | 800 | 1 | 1850 | 30 | 2 | 0.36 | Platelet | 2 | 870 | 7.1 |
| 2 | 800 | 1 | 1650 | 30 | 2 | 0.34 | Platelet | 2 | 850 | 7.2 |
| 3 | 800 | 1 | 1700 | 30 | 2 | 0.32 | Platelet | 2 | 890 | 7.4 |
| 4 | 900 | 1 | 1700 | 20 | 2 | 0.36 | Platelet | 2 | 820 | 7.2 |
| 5 | 600 | 1 | 1700 | 30 | 2 | 0.37 | Platelet | 2 | 840 | 7.6 |
| 6 | 800 | 1 | 1700 | 30 | 2 | 0.31 | Platelet | 1 | 870 | 7.1 |
| 7 | 600 | 1 | 1700 | 40 | 2 | 0.31 | Platelet | 3 | 870 | 7.5 |
| 8 | 1000 | 2 | 1700 | 30 | 2 | 0.31 | Platelet | 1 | 800 | 7.1 |

TABLE 10-continued

| | Heat treatment | | Hot pressing | | | Flank wear (mm) | α-Al₂O₃ grain morphology | | Bending strength (MPa) | Fracture toughness (MPa m^½) |
|---|---|---|---|---|---|---|---|---|---|---|
| | Temperature (°C.) | Time (Hr) | Temperature (°C.) | Pressure (MPa) | Time (Hr) | | Shape | Size (μm) | | |
| 9 | 800 | 1 | 1750 | 30 | 2 | 0.30 | Platelet | 2 | 850 | 7.2 |
| 10 | 800 | 1 | 1750 | 30 | 1 | 0.32 | Platelet | 1 | 870 | 7.5 |
| 11 | 800 | 1 | 1800 | 30 | 2 | 0.33 | Platelet | 1 | 850 | 7.3 |
| 12 | 800 | 1 | 1600 | 30 | 1 | 0.35 | Platelet | 2 | 830 | 7.1 |
| 13 | 900 | 2 | 1700 | 30 | 1 | 0.32 | Platelet | 1 | 880 | 7.2 |
| 14 | 900 | 1 | 1700 | 30 | 1 | 0.34 | Platelet | 1 | 870 | 7.0 |
| Conventional ceramics | | | | | | | | | | |
| 1 | — | — | 1750 | 30 | 2 | Fractured in 17 min. | Equiaxed | 2 | 820 | 6.0 |
| 2 | — | — | 1750 | 30 | 2 | Fractured in 8 min. | Equiaxed | 1 | 840 | 5.5 |
| 3 | — | — | 1750 | 30 | 2 | Fractured in 11 min. | Equiaxed | 2 | 810 | 5.9 |
| 4 | — | — | 1750 | 30 | 2 | Fractured in 12 min. | Equiaxed | 2 | 830 | 6.0 |

EXAMPLE 6

There were prepared Al₂O₃ powder, having an average particle size of 0.3 μm; as the raw material, powders of various compounds of Li, K, Na, Ca, Sr and Ba, SiO₂ powder, and Si alkoxide, having an average particle size of from 0.1 to 5 μm, as the promoters, and ZrO₂ powder, HfO₂ powder, partially stabilized ZrO₂ and partially stabilized HfO₂ containing Y₂O₃ and CeO₂, carbide powder, nitride powder and carbonitride powder of IVa, Va, VIa group metals and SiC powder, having an average particle size of from 0.1 to 2 μm, and SiC whisker, having a length of from 15 to 50 μm and a diameter of from 0.4 to 2 μm and containing at least 70% whiskers of an aspect ratio of from 35 to 40 as the controllers. Samples of the Al₂O₃ based ceramic composite of the present invention were prepared by first blending the promoters into Al₂O₃ powder at a ratio shown in Table 11 (ratio to the overall mixture)1, mixing the same on a ball mill for 72 hours, then carrying out a heat treatment in the air under conditions as shown in Table 12, then blending controllers other than SiC whisker into the heat-treated mixture at a ratio as shown in Table 11, mixing the same on a wet ball mill for 24 hours into slurry, blending SiC whisker at a ratio shown in Table 11, wet-mixing for two hours by means of ultrasonic waves and mechanical mixing, and after drying, hot-pressing the same under conditions shown in Table 12.

For comparison purposes, furthermore, samples of the conventional Al₂O₃ based ceramic composite were prepared by using the above-mentioned Al₂O₃ powder, ZrO₂ powder, HfO₂ powder, partially stabilized ZrO₂ powder and partially stabilized HfO₂ powder containing Y₂O₃ and CeO₂, and SIC whisker as the raw material powders, mixing these raw material powders under the same conditions so as to achieve a blended composition as shown in Table 11, and hot-pressing the blend under conditions as shown in Table 12 without applying a heat treatment.

TABLE 11

| | Blending composition (% by weight) | | | | | | |
|---|---|---|---|---|---|---|---|
| | Additives promoting α-Al₂O₃ platelet formation | | Si-compounds | | Components controlling the grain growth of α-Al₂O₃ platelets | | |
| | Li,K,Na,Ca,Sr,Ba-compounds | | | | | | |
| | Amount | Convert into oxide | Amount | Convert into oxide | Unstabilized and partially stabilized ZrO₂/HfO₂ | SiC whisker | IVa,Va,IVa compounds and SiC | Al₂O₃ |

| | | | | | | | | |
|---|---|---|---|---|---|---|---|---|
| | Ceramics of present invention | | | | | | | |
| 1 | CaCO₃:0.05 | 0.02 | Si(OCH₃)₄:0.1 Si(OC₂H₅)₄:0.1 | 0.07 | ZrO₂:5 | 25 | TiCN:10 | Remainder |
| 2 | SrCO₃:0.2 | 0.14 | SiO₂:0.2 | 0.20 | ZrO₂:15 | 15 | SiC:10 | Remainder |
| 3 | CaCl₂:0.2 | 0.10 | SiO₂:0.02 | 0.02 | ZrO₂:10 | 15 | TiC:5,TiN:10 | Remainder |
| 4 | BaCl₂:2.7 | 2.00 | SiO₂:1.5 | 1.50 | HfO₂:15 | 20 | SiC:5 | Remainder |
| 5 | SrCl₂:1.0 | 0.65 | SiO₂:0.4 | 0.40 | ZrO₂:15 | 15 | ZrN:10 | Remainder |
| 6 | CaO:1.5 | 1.50 | SiO₂:1.0 | 1.00 | ZrO₂:10,ZrO₂(Y₂O₃:2 mol %):5 | 20 | ZrC:5 | Remainder |
| 7 | SrO:0.4 | 0.40 | SiO₂:1.0 | 0.20 | ZrO₂:10 | 15 | TiC:5,TiN:5,SiC:5 | Remainder |
| 8 | CaCO₃:0.1,CaO:0.1 | 0.14 | SiO₂:0.2 | 0.20 | ZrO₂:5,HfO₂:10 | 15 | HfCN:10 | Remainder |
| 9 | BaCl₂:0.4,SrO:0.2 | 0.49 | SiO₂:0.2 | 0.20 | ZrO₂(CeO₂:12 mol %):5,ZrO₂(Y₂O₃:2 mol %):5 | 15 | TiCN:15 | Remainder |
| 10 | BaCO₃:0.2,CaCl₂:0.1,Sr(NO₃)₂:0.1 | 0.25 | SiO₂:0.2 | 0.20 | ZrO₂:15 | 10 | WC:15 | Remainder |
| 11 | Sr(NO₃)₂:0.2 SrCO₃:0.1,BaO:0.2 | 0.37 | SiO₂:0.3 Si(OC₃H₇)₄:0.2 | 0.35 | HfO₂(Y₂O₃:2 mol %):10 | 20 | TiCN:10 | Remainder |
| 12 | Na₂CO₃:0.1 | 0.06 | SiO₂:0.1 | 0.10 | ZrO₂:15 | 15 | NbC:10 | Remainder |
| 13 | LiNO₃:0.5,SrCO₃:0.5 | 0.68 | SiO₂:0.5 | 0.50 | HfO₂:15 | 20 | TaN:5 | Remainder |
| 14 | BaC₂O₄·H₂O:2.0 | 1.26 | SiO₂:1.5 | 1.50 | — | 25 | TiCN:15 | Remainder |
| 15 | Li₂CO₃:0.05,Na₂SO₄:0.05 | 0.04 | SiO₂:0.1 | 0.10 | — | 10 | TiN:10 | Remainder |
| | Conventional ceramics | | | | | | | |
| 1 | — | — | — | — | ZrO₂(Y₂O₃:2 mol %):15 | 15 | TiCN:10 | Remainder |
| 2 | — | — | — | — | HfO₂:10 | 20 | TiC:10,TiCN:10 | Remainder |
| 3 | — | — | — | — | ZrO₂(CeO₂:12 mol %):10 ZrO₂(Y₂O₃:2 mol %):10 | 10 | TiN:5,SiC:5 | Remainder |
| 4 | — | — | — | — | ZrO₂:10 | 15 | TiC:10,TiC:10,SiC:5 | Remainder |

TABLE 12

| | Heat treatment | | Hot pressing | | | Flank | $\alpha$-$Al_2O_3$ | | Bending | Fracture |
|---|---|---|---|---|---|---|---|---|---|---|
| | Temperature (°C.) | Time (Hr) | Temperature (°C.) | Pressure (MPa) | Time (Hr) | wear (mm) | grain morphology | | strength (MPa) | toughness (MPa m$^{\frac{1}{2}}$) |
| | | | | | | | Shape | Size (μm) | | |
| Ceramics of present invention | | | | | | | | | | |
| 1 | 600 | 1 | 1850 | 40 | 2 | 0.30 | Platelet | 2 | 840 | 6.9 |
| 2 | 800 | 1 | 1750 | 30 | 2 | 0.30 | Platelet | 2 | 840 | 6.7 |
| 3 | 1050 | 1 | 1850 | 30 | 2 | 0.32 | Platelet | 2 | 870 | 6.8 |
| 4 | 900 | 2 | 1750 | 30 | 1 | 0.36 | Platelet | 1 | 850 | 7.0 |
| 5 | 900 | 1 | 1800 | 30 | 2 | 0.30 | Platelet | 1 | 880 | 7.1 |
| 6 | 600 | 2 | 1650 | 30 | 2 | 0.29 | Platelet | 2 | 860 | 6.8 |
| 7 | 800 | 1 | 1750 | 30 | 2 | 0.28 | Platelet | 1 | 840 | 7.0 |
| 8 | 800 | 1 | 1750 | 30 | 2 | 0.28 | Platelet | 1 | 860 | 7.0 |
| 9 | 800 | 1 | 1800 | 20 | 2 | 0.31 | Platelet | 1 | 840 | 6.6 |
| 10 | 900 | 1 | 1800 | 30 | 2 | 0.29 | Platelet | 1 | 870 | 6.7 |
| 11 | 1000 | 1 | 1750 | 30 | 2 | 0.31 | Platelet | 1 | 900 | 7.1 |
| 12 | 600 | 1 | 1750 | 30 | 2 | 0.29 | Platelet | 2 | 860 | 7.1 |
| 13 | 600 | 2 | 1750 | 30 | 2 | 0.30 | Platelet | 1 | 880 | 7.0 |
| 14 | 900 | 2 | 1750 | 30 | 2 | 0.30 | Platelet | 2 | 870 | 7.2 |
| 15 | 800 | 1 | 1750 | 30 | 2 | 0.32 | Platelet | 2 | 890 | 7.0 |
| Conventional ceramics | | | | | | | | | | |
| 1 | — | — | 1750 | 30 | 2 | Fractured in 12 min. | Equiaxed | 1 | 830 | 5.4 |
| 2 | — | — | 1750 | 30 | 2 | Fractured in 15 min. | Equiaxed | 1 | 810 | 5.9 |
| 3 | — | — | 1800 | 30 | 2 | Fractured in 10 min. | Equiaxed | 1 | 850 | 5.4 |
| 4 | — | — | 1750 | 30 | 2 | Fractured in 17 min. | Equiaxed | 1 | 840 | 5.7 |

Subsequently, a cast iron milling test was carried out under the same conditions as in the Example 4 for the thus obtained samples of the various ceramics. The results are shown in Table 12. The shape, particle size, bending strength and fracture toughness of $\alpha$-$Al_2O_3$ grains and also shown in Table 12.

As is clear from Table 12, the ceramics of the present invention, having a structure in which $Al_2O_3$ grains have grown into platelets, have a strength of the same order as that of the conventional ceramics, but are superior in toughness. This is reflected in the fact that the ceramics of the present invention are free from occurrence of breakage or chipping in wet milling of cast iron and display excellent wear resistance for a long period of time.

EXAMPLE 7

Using the same raw materials as in the Examples 1 and 2, a liquid phase was prepared as shown in Table 13, by first blending the promoters and $Al_2O_3$ powder, and after mixing the same on a ball mill for 72 hours, heat-treating the mixture in the air. After grinding this liquid phase, the liquid phase, $Al_2O_3$ powder and the controllers were blended, mixed on a ball mill for 72 hours, and after drying, the mixture was press-formed into pressurized powder of a prescribed shape under a pressure of 1 ton/cm$^2$. Samples of $Al_2O_3$-$ZrO_2$ based ceramics of the present invention were prepared by sintering the formed mixture for an hour at a temperature shown in Table 14.

TABLE 13

| | Composition of additives for liquid forming, and its content | | | | | | Heat treatment | | | Components controlling the grain growth of α-Al₂O₃ platelets Unstabilized and partially stabilized ZrO₂/HfO₂ | Al₂O₃ |
|---|---|---|---|---|---|---|---|---|---|---|---|
| | Li,K,Na,Ca,Sr,Ba-compounds | | Si-compounds | | Al₂O₃ | | | | | | |
| | Amount | Convert into oxide | Amount | Convert into oxide | Amount | Convert into oxide | Temperature (°C) | Time (Hr) | Content | | |
| Ceramics of present invention | | | | | | | | | | | |
| 1 | CaCO₃:50 | 35 | SiO₂:40 | 51 | 10 | 14 | 1400 | 2 | 1 | ZrO₂:10 | Remainder |
| 2 | BaCO₃:50 | 44 | SiO₂:40 | 45 | 10 | 11 | 1500 | 2 | 2 | ZrO₂(Y₂O₃:2 mol %):40 | Remainder |
| 3 | SrCO₃:70 | 61 | SiO₂:20 | 26 | 10 | 13 | 1350 | 2 | 2 | ZrO₂:20 | Remainder |
| 4 | Ca(NO₃)₂:70 | 42 | SiO₂:20 | 39 | 10 | 19 | 1400 | 2 | 3 | ZrO₂(CeO₂:12 mol %):25 | Remainder |
| 5 | Ba(NO₃)₂:35 | 48 | Si(OC₂H₅)₄:60 | 40 | 5 | 12 | 1400 | 2 | 2 | ZrO₂:5 | Remainder |
| 6 | CaO:15,SrO:15 | 30 | SiO₂:55 | 55 | 15 | 15 | 1400 | 2 | 3 | ZrO₂(Y₂O₃:3 mol %):10,ZrO₂:10 | Remainder |
| 7 | Na₂CO₃:45 | 30 | SiO₂:50 | 65 | 5 | 5 | 1200 | 4 | 1 | ZrO₂:20 | Remainder |
| 8 | K₂NO₃:40 | 24 | SiO₂:55 | 70 | 5 | 6 | 1150 | 2 | 0.5 | HfO₂:15 | Remainder |
| 9 | CaO:30 | 30 | SiO₂:58 | 58 | 12 | 12 | 1300 | 3 | 2 | ZrO₂:20 | Remainder |
| 10 | SrCl₂:55 | 45 | SiO₂:35 | 43 | 10 | 12 | 1350 | 2 | 4 | HfO₂(Y₂O₃:3 mol %):10 | Remainder |
| 11 | BaCl₂:20,Li₂SO₄:20 | 31 | SiO₂:40 | 61 | 5 | 8 | 1250 | 2 | 1 | ZrO₂(Y₂O₃:2 mol %):30 | Remainder |
| 12 | BaCO₃:30,SrCO₃:20 | 43 | SiO₂:40 | 46 | 10 | 11 | 1400 | 2 | 2 | ZrO₂:10,HfO₂:10 | Remainder |

Samples of conventional Al$_2$O$_3$-ZrO$_2$ based sintered ceramics were prepared in the same manner as in the Example 1.

Subsequently, a cutting test was carried out under the same conditions as in the Example 1 for various samples obtained as above. The shape, particle size, bending strength and fracture toughness of α-Al$_2$O$_3$ grains are also shown in Table 14.

As is clear from Table 14, the ceramics of the present invention, having a structure in which Al$_2$O$_3$ grains have grown into platelets, have an improved toughness over that of the conventional ceramics. This is reflected in the fact that, in spite of the almost equal cutting properties exhibited in continuous cutting of steel, the conventional ceramics suffers from breakage in the cutting edge in discontinuous cutting of steel in all cases, whereas all samples of the present invention are free from breakage or chipping in the cutting edge and displays an excellent wear resistance for a long period of time.

EXAMPLE 8

A liquid phase was prepared, as shown in Table 15, by using the same raw materials as in the Example 6, blending the promoters and Al$_2$O$_3$ powder, and after mixing the blend on a ball mill for 72 hours, heat-treating and grinding the mixture in the air. Mixed powder was obtained by blending this liquid phase with the controllers other than SiC whisker, mixing the blend on a wet ball mill for 24 hours into slurry, blending SiC whisker into the mixture, wet-mixing the same for 24 hours by means of ultrasonic waves and mechanical mixing, and drying the same. Samples of Al$_2$O$_3$ based ceramic composite of the present invention were prepared by hot-pressing this mixed powder under conditions as shown in Table 16.

TABLE 14

| | Sintering temperature (°C.) | Flank wear (mm) | | α-Al$_2$O$_3$ grain morphology | | Bending Strength (MPa) | Fracture toughness (MPa m$^{\frac{1}{2}}$) |
| --- | --- | --- | --- | --- | --- | --- | --- |
| | | Interrupt | Continuous | Shape | Size (μm) | | |
| | Ceramics of present invention | | | | | | |
| 1 | 1650 | 0.30 | 0.27 | Platelet | 9 | 730 | 5.2 |
| 2 | 1700 | 0.31 | 0.24 | Platelet | 3 | 900 | 5.1 |
| 3 | 1600 | 0.26 | 0.21 | Platelet | 4 | 860 | 5.4 |
| 4 | 1550 | 0.28 | 0.23 | Platelet | 3 | 780 | 5.0 |
| 5 | 1700 | 0.31 | 0.19 | Platelet | 12 | 790 | 5.5 |
| 6 | 1550 | 0.28 | 0.18 | Platelet | 3 | 760 | 5.4 |
| 7 | 1400 | 0.26 | 0.21 | Platelet | 3 | 750 | 5.6 |
| 8 | 1500 | 0.25 | 0.20 | Platelet | 6 | 800 | 5.2 |
| 9 | 1600 | 0.27 | 0.22 | Platelet | 4 | 810 | 5.2 |
| 10 | 1450 | 0.28 | 0.26 | Platelet | 7 | 760 | 5.0 |
| 11 | 1500 | 0.30 | 0.24 | Platelet | 3 | 890 | 5.2 |
| 12 | 1600 | 0.31 | 0.23 | Platelet | 4 | 780 | 5.5 |

TABLE 15

| | Blending composition (% by weight) | | | | | | | | | | | |
|---|---|---|---|---|---|---|---|---|---|---|---|---|
| | Composition of additives for liquid forming, and its content | | | | | | Heat treatment | | | Components controlling the grain growth of α-Al₂O₃ platelets | | |
| | Li,K,Na,Ca,Sr,Ba-compounds | | Si-compounds | | Al₂O₃ | | | | | Unstabilized and partially stabilized ZrO₂/HfO₂ | | IVa,Va,VIa |
| | Amount | Convert into oxide | Amount | Convert into oxide | Amount | Convert into oxide | Temperature (°C.) | Time (Hr) | Content | | SiC whisker | compounds and SiC | Al₂O₃ |
| | Ceramics of present invention | | | | | | | | | | | | |
| 1 | CaCO₃:50 | 35 | SiO₂:40 | 51 | 10 | 14 | 1400 | 2 | 1 | ZrO₂:10 | 20 | — | Remainder |
| 2 | BaCO₃:50 | 44 | SiO₂:40 | 45 | 10 | 11 | 1500 | 2 | 2 | ZrO₂(Y₂O₃:2 mol %):20 | 20 | — | Remainder |
| 3 | SrCO₃:70 | 61 | SiO₂:20 | 26 | 10 | 13 | 1350 | 2 | 2 | ZrO₂:20 | 20 | — | Remainder |
| 4 | Ca(NO₃)₂:70 | 42 | SiO₂:20 | 39 | 10 | 19 | 1400 | 2 | 3 | ZrO₂(CeO₂:12 mol %):25 | 15 | — | Remainder |
| 5 | Ba(NO₃)₂:35 | 48 | Si(OC₂H₅)₄:60 | 40 | 5 | 12 | 1400 | 2 | 2 | — | 20 | TiC:20 | Remainder |
| 6 | CaO:15 SrO:15 | 30 | SiO₂:55 | 55 | 15 | 15 | 1400 | 4 | 3 | ZrO₂:10 | 15 | TiN:15 | Remainder |
| 7 | Na₂CO₃:45 | 32 | SiO₂:55 | 68 | 0 | 0 | 1200 | 4 | 1 | — | 25 | — | Remainder |
| 8 | K₂NO₃:40 | 24 | SiO₂:55 | 70 | 5 | 6 | 1150 | 2 | 0.5 | — | 20 | TiN:20 | Remainder |
| 9 | CaO:30 | 30 | SiO₂:58 | 58 | 12 | 12 | 1300 | 3 | 2 | ZrO₂:20 | 15 | SiC:5 | Remainder |
| 10 | SrCl₂:55 | 45 | SiO₂:35 | 43 | 10 | 12 | 1350 | 2 | 4 | ZrO₂:10 | 20 | TiC:10 | Remainder |
| 11 | BaCl₂:20 Li₂SO₄:20 | 31 | SiO₂:40 | 61 | 5 | 8 | 1250 | 2 | 1 | ZrO₂(Y₂O₃:2 mol %):15 | 15 | WC:10 | Remainder |
| 12 | BaCO₃:30 SrCO₃:20 | 43 | SiO₂:40 | 46 | 10 | 11 | 1400 | 2 | 2 | ZrO₂:20 | 10 | TiN:10 | Remainder |

Samples of the conventional $Al_2O_3$ based ceramic composite were prepared in the same manner as in the Examples 4, 5 and 6.

Subsequently, for samples prepared as mentioned above, a milling test of cast iron was carried out under the same conditions as in the Examples 4, 5 and 6. The results are shown in Table 16. The shape, particle size, bending strength and fracture toughness of $\alpha$-$Al_2O_3$ grains are also shown in Table 16.

As is clear from Table 16, the ceramics of the present invention, having a structure in which $Al_2O_3$ grains have grown into platelets, have a strength of the same order as that of the conventional ceramics, but are superior in toughness, and this is reflected in the fact that the ceramics of the present invention are free from occurrence of breakage or chipping in wet milling of cast iron and display excellent wear resistance for a long period of time.

EXAMPLE 9

A surface-coated ceramics made by forming a hard coating layer on the surface of $Al_2O_3$ based ceramic composite comprising platelet $\alpha$-$Al_2O_3$ will now be described by means of an example covering the case of a cutting tool.

A cutting tool made of surface-coated $Al_2O_3$ based ceramic composite of the present invention (hereinafter referred to as the "coated cutting tool of the invention") was prepared by forming a hard coating layer having a chemical composition and an average thickness as shown in Table 17, which comprised a single layer or multiple layers of Ti carbide, nitride, carbonitride, carbonate and carbonate-nitrides and Al oxide under a reduced pressure of up to 100 torr at a temperature of from 950° C. to 1,050° C. on the surface of the substrate made of the ceramics of the present invention having the shape of the previously mentioned cutting tool JIS SNGN 120408, by using an ordinary chemical vapor depositing apparatus.

TABLE 16

| | Hot pressing | | | Flank | $\alpha$-$Al_2O_3$ | | Bending | Fracture |
|---|---|---|---|---|---|---|---|---|
| | Temperature (°C.) | Pressure (MPa) | Time (Hr) | wear (mm) | grain morphology | | strength (MPa) | toughness (MPa m$^{\frac{1}{2}}$) |
| | | | | | Shape | Size ($\mu$m) | | |
| | Ceramics of present invention | | | | | | | |
| 1 | 1750 | 30 | 2 | 0.33 | Platelet | 2 | 800 | 7.0 |
| 2 | 1750 | 30 | 2 | 0.34 | Platelet | 1 | 840 | 7.3 |
| 3 | 1750 | 30 | 1 | 0.32 | Platelet | 1 | 820 | 7.1 |
| 4 | 1600 | 30 | 2 | 0.33 | Platelet | 1 | 800 | 7.2 |
| 5 | 1850 | 30 | 1 | 0.35 | Platelet | 1 | 850 | 7.4 |
| 6 | 1800 | 25 | 2 | 0.34 | Platelet | 1 | 900 | 7.0 |
| 7 | 1800 | 30 | 2 | 0.31 | Platelet | 3 | 820 | 7.2 |
| 8 | 1750 | 30 | 1 | 0.32 | Platelet | 2 | 850 | 7.4 |
| 9 | 1750 | 30 | 2 | 0.31 | Platelet | 1 | 850 | 6.5 |
| 10 | 1750 | 30 | 2 | 0.33 | Platelet | 1 | 870 | 7.4 |
| 11 | 1800 | 40 | 1 | 0.35 | Platelet | 1 | 920 | 7.3 |
| 12 | 1750 | 30 | 1 | 0.37 | Platelet | 1 | 800 | 7.2 |

TABLE 17

| | | Blending composition of ceramic substrates (% by weight) | | | | Hard coating layer | | | | |
|---|---|---|---|---|---|---|---|---|---|---|
| Examples | | Additives promoting α-Al₂O₃ platelet formation | | | Components controlling the grain growth of α-Al₂O₃ paltelets | | | | | |
| Example No. | Sample No. | Li,Na,K,Ca,Sr,Ba-compounds | SiO₂ | | Al₂O₃ | 1st layer (μm) | 2nd layer (μm) | 3rd layer (μm) | 4th layer (μm) | 5th layer (μm) | Flank wear (mm) |

| Example No. | Sample No. | Li,Na,K,Ca,Sr,Ba-compounds | SiO₂ | Components controlling the grain growth of α-Al₂O₃ paltelets | Al₂O₃ | 1st layer (μm) | 2nd layer (μm) | 3rd layer (μm) | 4th layer (μm) | 5th layer (μm) | Flank wear (mm) |
|---|---|---|---|---|---|---|---|---|---|---|---|
| *Coated ceramic cutting tools of present invention* | | | | | | | | | | | |
| 1 | 1 | 1 | SrCO₃:0.4 | 0.3 | ZrO₂:20 | Remainder | TiN:2 | Al₂O₃:3 | — | — | — | 0.34 |
| 2 | 1 | 13 | LiNO₃:0.09 | 0.2 | HfO₂(Y₂O₃:3 mol %):20 | Remainder | Al₂O₃:2 | TiC:1 | — | — | — | 0.35 |
| 3 | 3 | 8 | K₂SO₄:0.4,SrCO₃:0.1 | 0.4 | ZrO₂(CeO₂:12 mol %):20 TiN:20 | Remainder | TiC:6 | TiCNO:2 | Al₂O₃:2 | — | — | 0.36 |
| 4 | 3 | 9 | SrCO₃:0.5 | 0.5 | SiC:20 | Remainder | TiC:6 | TiCN:2 | TiCNO:1 | — | — | 0.37 |
| 5 | 3 | 14 | K₂SO₄:0.1,Na₂SO₄:0.1 | 0.3 | TiCN:20 | Remainder | TiCN:2 | Al₂O₃:3 | TiN:1 | — | — | 0.33 |
| 6 | 4 | 4 | Ca(NO₃)₂:0.15 | 0.02 | SiC whisker:20 | Remainder | TiC:4 | TiCNO:2 | Al₂O₃:2 | — | — | 0.37 |
| 7 | 5 | 13 | BaC₂O₄ H₂O:1.0 | 1.0 | ZrO₂:15 SiC whisker:25 | Remainder | TiCN:2 | TiC:3 | Al₂O₃:2 | TiCNO:1 | TiCN:2 | 0.37 |
| *Conventional coated ceramic cutting tools* | | | | | | | | | | | |
| 1 | 1 | 2 | — | — | ZrO₂:20 | Remainder | TiN:2 | Al₂O₃:3 | — | — | — | Fractured in 5 min. |
| 2 | 3 | 3 | — | — | HfO₂:10 SiC:10 | Remainder | TiN:2 | Al₂O₃:3 | — | Al₂O₃:2 | TiCN:2 | Fractured in 4 min. |
| 3 | 3 | 5 | — | — | TiCN:30 | Remainder | TiCN:2 | Al₂O₃:3 | TiN:1 | — | — | Fractured in 2 min. |
| 4 | 4 | 3 | — | — | SiC whisker:30 | Remainder | Al₂O₃:2 | TiC:1 | — | — | — | Fractured in 10 min. |
| *Comparative uncoated ceramic cutting tools* | | | | | | | | | | | |
| 1 | 1 | 15 | BaC₂O₄ H₂O:0.4 | 0.2 | ZrO₂:20 | Remainder | — | — | — | — | — | The useful life time of this tool was 10 min. of cutting because the wear was above 0.4 mm. |
| 2 | 3 | 1 | BaCO₃:0.5 | 0.3 | ZrO₂(Y₂O₃:3 mol %):15 TiCN:10 | Remainder | — | — | — | — | — | The useful life time was 6 min. |
| 3 | 3 | 14 | K₂SO₄:0.1,Na₂SO₄:0.1 | 0.3 | TiCN:25 | Remainder | — | — | — | — | — | The useful life time was 8 min. |
| 4 | 4 | 4 | Ca(NO₃)₂:0.15 | 0.05 | SiC whisker:20 | Remainder | — | — | — | — | — | The useful life time was 6 min. |
| 5 | 5 | 1 | CaCO₃:0.05 | 0.02 | ZrO₂:5 SiC whisker:30 | Remainder | — | — | — | — | — | The useful life time was 6 min. |

A cutting tool made of conventional surface coated $Al_2O_3$ based ceramics (hereinafter referred to as the "conventional coated cutting tool" was prepared by forming a hard coating layer by the above-mentioned chemical vapor deposition on the surface of the above-mentioned conventional $Al_2O_3$ based ceramic substrate of cutting tool having a chemical composition outside the scope of the $Al_2O_3$ based ceramic composite of the present invention.

For these coated tools, a high-speed continuous cutting test of steel was carried out under conditions:

Material to be cut: SCM440 (hardness: HB250),
Cutting speed: 420 mm/min,
Food: 0.36 mm/rev.,
Depth of cut: 2 mm, and
Wet cutting time: 15 minutes, and wear of the relief face of the cutting edge was measured. The results are shown in Table 17. For comparison purposes, a similar cutting test was carried out on a cutting tool made of the $Al_2O_3$ based ceramic composite of the present invention having no hard coating layer formed thereon (hereinafter referred to as the "comparative cutting tool"). The results are also shown in Table 17.

As is evident from the results shown in Table 17, while the coated cutting tool of the invention exhibits an excellent wear resistance under the effect of the hard coating layer excellent in adherence even in wet high-speed cutting of steel, which requires a high wear resistance, the conventional coated cutting tool shows only a very limited service life because of the breakage resulting from the poor toughness of the substrate. In the comparative cutting tool having no hard coating layer, the service life is limited by the wear of the relief face in a very short period of time as a result of a poor wear resistance. In this Example, the moment when the worn width became 0.4 mm was considered the end of the service life.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A platelet $\alpha$-$Al_2O_3$ based ceramic composite, consisting essentially of:
    Platelet $\alpha$-$Al_2O_3$ grains;
    from 0.02 to 4 weight percent of a first additive for promoting platelet formation in grains of said $\alpha$-$Al_2O_3$, wherein said first additive is at least one salt selected from the group consisting of Li, K, Na, Ca, Sr and Ba;
    from 5 to 40 weight percent of a second additive for controlling grain growth of $\alpha$-$Al_2O_3$ platelets, wherein said second additive is at least one selected from the group consisting of $ZrO_2$, $HfO_2$, SiC whiskers, SiC particles, and carbides, nitrides or carbonitrides of IVA, Va, and VIa group metals; and
    said $\alpha$-$Al_2O_3$, said first additive and said second additive forming said $\alpha$-$Al_2O_3$ composite.

2. A platelet $\alpha$-$Al_2O_3$ based ceramic composite as in claim 1, wherein:
    said first additive being from about 0.02 to about 2 weight percent of said $\alpha$-$Al_2O_3$ composite.

3. A platelet $\alpha$-$Al_2O_3$ based ceramic composite as in claim 1, wherein said second additive is partially stabilized $ZrO_2$ or partially stabilized $HfO_2$ and wherein
    said partially stabilized $HfO_2$ and $ZrO_2$ further include a solid solution containing at least one of a $Y_2O_3$, MgO, CaO, and $CeO_2$.

4. A platelet $\alpha$-$Al_2O_3$ based ceramic composite according to claim 1, wherein said $\alpha$-$Al_2O_3$ grains have a diameter up to 15 $\mu$m.

* * * * *